United States Patent Office 3,730,945
Patented May 1, 1973

3,730,945
COMPOSITIONS OF EPOXY RESINS AND THE REACTION PRODUCTS OF MULTIAZIRIDINO COMPOUNDS AND HYDROGEN SULFIDE
Heinz Uelzmann, Cuyahoga Falls, and David C. Hidinger, Jr., Akron, Ohio, assignors to The General Tire & Rubber Company
No Drawing. Application Nov. 3, 1969, Ser. No. 873,683, which is a division of application Ser. No. 637,352, May 10, 1967, now Patent No. 3,514,369. Divided and this application Jan. 14, 1972, Ser. No. 217,970
Int. Cl. C08f *30/14*
U.S. Cl. 260—47 EN                               10 Claims

ABSTRACT OF THE DISCLOSURE

Novel adducts of multiaziridino compounds are prepared by reacting $H_2S$ with multiaziridino compounds. The reaction products, which contain secondary amino and thio groups, may be used to form adhesives, particularly with epoxy compounds, and metal-to-metal laminates.

---

This application is a division of copending U.S. patent application Ser. No. 873,683, filed Nov. 3, 1969 which in turn is a division of prior U.S. patent application Ser. No. 637,352, filed May 10, 1967 and entitled "Reaction Products of Multiaziridino Compounds and Hydrogen Sulfide and Adhesive Compositions," now U.S. Pat. No. 3,514,369.

BACKGROUND OF THE INVENTION

Compounds containing the aziridino group, i.e.,

are known to be reactive with mercapto compounds (see "Annalen" 566, 210) according to the following general equation:

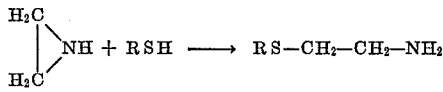

This basic reaction has been used to form amino alkyl thio benzenes (see "J. Am. Chem. Soc." 80, 3458) by employing benzene-thiol and similar aryl mercaptans to react with aziridino compounds.

Instead of using monomeric, monofunctional reagents in this class of reaction, polymeric-type multifunctional reagents have been used to prepare polymeric products by reaction of polyalkylene polysulfide prepolymers with polyfunctional aziridine ring containing monomers (see U.S. 3,119,782). A variety of multiaziridino compounds are disclosed as useable in preparing the polymeric materials.

Many varieties of multiaziridino compounds are known and, hence, are potential reagents for use in reaction with mercapto compounds, e.g., polyaziridinyl phosphate esters (U.S. 3,226,377), polyaziridinyl carbamates (U.S. 3,119,782), polyaziridinyl phosphonic acids (U.S. 2,654,738) and a host of other multiaziridino compounds (U.S. 3,260,702).

The present invention, by employing the general thiol aziridinyl group reaction mentioned above in a new manner, i.e., through reaction of $H_2S$ with specific multiaziridino monomeric compounds, has been able to create new compounds containing secondary amino groups and thioether or mercapto groups which are of relatively high reactivity to other compounds, e.g., epoxy groups. Mercapto groups in the new compounds are reactive with oxygen of the air making possible in situ formation of disulfide linkages useful in epoxy resin cross-linking operations.

OBJECTS

A principal object of this invention is the provision of new compounds containing secondary amino groups and thioether or mercapto groups which are active adhesive agents. Further objects include the provision of:

(1) New highly effective cross-linkers for epoxide compounds.

(2) New methods of compounding epoxy adhesives having good curing properties which may be augmented by further air curing.

(3) Improved forms of epoxide base paints and similar coating compositions.

Other objects and further scope of applicability of the present invention will become apparent from the detailed description given hereinafter; it should be understood, however, that the detailed description and specific examples, while indicating preferred embodiments of the invention, are given by way of illustration, only since various changes and modifications within the spirit and scope of the invention will become apparent to those skilled in the art from this detailed description.

SUMMARY OF THE INVENTION

These objects are accomplished, in part, by the production of new reaction products from hydrogen sulfide reacted with multiaziridino compounds of the general formula:

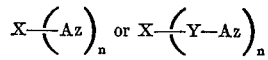

wherein the letters designate radicals as follows:

X is aryl, alkyl or

$R^1$ is hydrogen, hydrocarbons, —Az or —Y—Az,

Az is

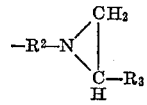

$R^2$ is alkylene,
$R^3$ is hydrogen or alkyl,

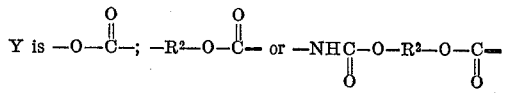

and
n is an integer selected from 2 and 3.

The invention also involves the discovery that highly effective adhesive compositions may be prepared using these new reaction products as an active adhesive agent. The reaction products are not adhesives per se, but may be considered as construction materials for adhesives.

As a preferred embodiment, new adhesives are created by combining such reaction products with epoxy resins, advantageously, in a mixture of 5 to 95% epoxy resin and 95 to 5% of the new reaction products of hydrogen sulfide with the multiaziridino compounds of the type as hereinbefore defined. Adhesives may be made from mixtures of two or more of the new reaction products and/or two or more epoxy resins. Adhesives containing from 25 to 75% epoxy resin and 75 to 25% of the new reaction products provide particularly useful properties. Additional agents such as fillers, pigments, dyes, accelerators, solvents and similar materals up to about 50% of the total weight of the adhesive may be included.

A noteworthy feature of the invention is the discovery of the ability of the new reaction products to undergo air curing. Thus, mercapto groups which may exist in the reaction products can undergo cross-linking by exposure to oxygen of the air apparently by means of the formation of disulfide linkages. The new reaction products also contain —NH— groups which may react with epoxy groups enabling the reaction products to cross-link and cure epoxy resins, e.g., in adhesive compositions. The air-curing feature, when utilized with epoxy resins, permits unique air curing epoxide base paints and other coating compositions to be formulated. The —SH groups in the new reaction products may react with isocyanate terminated prepolymers to cure them or with activated double bonds, e.g., as in acrylonitrile and acrylic esters.

The new reaction products may be advantageously formed to contain aziridino groups, in addition to —NH— and —SH groups giving products of high chemical activity, e.g., useful in curing and cross-linking epoxy resins.

A further important finding of the invention is the good metal-to-metal bonding that can be attained with adhesive compositions containing the new reaction products. As a result, the invention encompasses as new products laminated structures comprising a metal-to-metal portion bonded together with an adhesive comprising the reaction products, e.g., 95 to 5% of such reaction product and 5 to 95% of an epoxy resin.

EXAMPLES

The following details of operations in accordance with the invention and reported data illustrate the further principles and practice of the invention to those skilled in the art. In these examples and throughout the remaining specification and claims, all parts and percentages are by weight and all temperatures are in degrees centigrade unless otherwise specified.

EXAMPLE 1

Nitrilo tris[ethyl(beta - N-ethylenimino)propionate] (235 parts) was dissolved in 156 parts dioxane in a glass reaction vessel. Hydrogen sulfide was bubbled into the stirred solution until the temperature rose to 56° C., at which time the H$_2$S addition was adjusted so that the exotherm maintained 50–55° C. in the reaction mixture. The addition of H$_2$S was continued at this rate, for 2 hours, after which the exotherm ceased. The dioxane was removed by vacuum distillation to 80° C. pot temperature at 5 mm. The residue, consisting of a product represented by the formula given below amounted to 280 parts, indicating 45 parts of H$_2$S had reacted.

Analysis.—Found (percent): —SH, 12.3; S, 12.64; N, 9.7. Calculated (percent): —SH, 11.7; S, 14.8; N, 10.1.

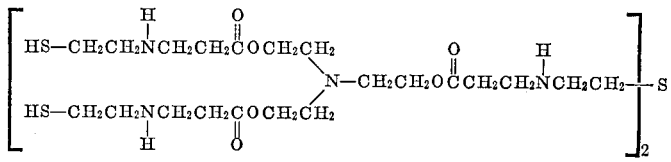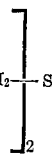

In a subsequent operation, 100 parts of "Epon 828" epoxy resin and 75 parts of the reaction product of nitrilo tris[ethyl(beta-N-ethylenimino)propionate] and H$_2$S were thoroughly mixed together. Test coupons which consisted of 1″ x 4″ strips of phosphated steel had the resulting adhesive applied to them after which they were placed together with 0.5 in. overlap. The specimens were secured in a clamp consisting of two 1″ square steel bars 6″ in length held together by bolts. The clamp nuts were tighened with a torque wrench to 15 in. lbs. torque. The assembly was placed in a 120° C. oven for 1 hour. The specimens were removed from the clamp and the shear adhesion value of the adhesive was obtained by pulling the specimens in an Instron tester at 0.05 in./min. crosshead speed. An average of the resulting test results gave a value of 1380 p.s.i. for the shear adhesion.

The "Epon 828" epoxy resin used as reported herein was a commercially available liquid product prepared in known manner for production of 1,2-epoxide resins by reaction predominantly of bisphenol A with an excess of epichlorohydrin in the presence of sodium hydroxide to give a product with viscosity of about 10,000–20,000 cps. at 23° C. and an epoxy value (mols per kg.) of about 5–6.

EXAMPLE 2

Bis[(beta-N-ethylenimino)ethyl]benzene (216 parts) was dissolved in 156 parts dioxane and heated to 45° C. The heating was stopped and H$_2$S was bubbled through the stirred solution. The addition was continued 4 hours at 55–65° C. The dioxane was removed by vacuum distillation to 180° C. pot temperature at 1 mm. The residue constituted the reaction product and amounted to 248 parts. This indicated that 32 parts of H$_2$S had reacted.

Analysis.—Found (percent): —SH, 10.3; S, 8.4, N, 10.5.

In a subsequent operation, 100 parts of "Epon 828" and 80 parts of the reaction product of bis[(beta-N-ethylenimino)ethyl] benzene and H$_2$S were mixed, cured and tested as in Example 1. An average shear adhesion of 2298 p.s.i. was obtained.

EXAMPLE 3

Ethylenimine (89 parts) was cooled to 10–20° C. in a glass reaction vessel and 162 parts of ethylene diacrylate were added dropwise, with stirring, at 10–20° C. The mixture was left standing overnight and the excess ethylenimine was distilled out. To the ethylene bis(beta-N-ethylenimino)propionate formed was added 156 parts dioxane and the solution was heated to 45° C. Hydrogen sulfide was then bubbled through at such a rate as to maintain 50° C. for 4 hours. The dioxane was then distilled out at 80° C. at 5 mm. The residue recovered amounted to 299 parts indicating that the reaction product was formed by the reaction of 51 parts of H$_2$S.

Analysis.—Found (percent): —SH, 14.55; S, 16.47; N, 8.7.

In a subsequent operation, 100 parts of "Epon 828" and 65 parts of the reaction product of ethylene bis(beta-N-ethylenimino)propionate and H$_2$S were mixed, cured and tested as in Example 1. An average shear adhesion of 2120 p.s.i. was obtained.

EXAMPLE 4

There was dissolved in 408 parts of dioxane 81 parts of 2,4 tolylene bis[(beta-N-ethylenimino)propionoxy ethyl] urethane and the solution was heated to 45–50° C. Hydrogen sulfide was bubbled in at this temperature for 3½ hours. The dioxane was distilled out under vacuum. The product was recovered as residue amounting to 102 parts indicating 21 parts of H$_2$S had reacted.

Analysis.—Found (percent): —SH, 14.1; S, 13.1; N, 12.5.

In a subsequent operation, 100 parts of "Epon 828" and 50 parts of the reaction product of N,N(2,4-tolylene) bis[(beta - N - aziridino)propionoxy ethyl] urethane and H$_2$S were mixed, cured and tested as in Example 1. An average shear adhesion of 1526 p.s.i. was obtained.

The aziridinourethane reagent used in the above example can be prepared by reacting 2 mols of hydroxy ethyl acrylate or similar hydroxyl alkyl acrylate with one mol of 2,4-tolylene diisocyanate. Ethylenimine is then reacted with the resulting ethylenic urethane by adding onto the double bond to give the bis-aziridino compound according to the technique disclosed in copending application Ser. No. 577,804, filed Sept. 8, 1966, now abandoned.

EXAMPLE 5

Bis[(beta-N-butylenimino)ethyl] benzene (68 parts) was dissolved in 259 parts dioxane and heated to 80° C. with stirring. Then, H$_2$S was bubbled through at this temperature for 2 hours. The dioxane was stripped out to 80° at 5 mm. The product was the residue recovered amounting to 72 parts.

Analysis.—Found (percent): —SH, 3.2; S, 3.14; N, 9.3.

In a subsequent operation, 100 parts of "Epon 828" and 75 parts of the reaction product of bis[(beta-N-butylenimino)ethyl] benzene and H$_2$S were mixed, cured and tested as in Example 1. An average adhesion value of 2778 p.s.i. was obtained.

In a further operation, 100 parts of "Epon 828" and 50 parts of the reaction product of bis[(beta-N-ethylenimino)ethyl] benzene and H$_2$S were mixed, cured and tested as in Example 1. An average shear adhesion value of 2200 p.s.i. was obtained.

EXAMPLE 6

Four hundred parts of the sodium salt of 2,6-di(N-ethyleniminomethyl)-4-methyl phenol in the form of a solution in isopropanol was prepared by first adding to a solution of 62 parts NaOH pellets in 400 parts of isopropanol, 167 parts of p-cresol with stirring to form sodium p-cresolate. The mixture was cooled at 30° C. and 139 parts of ethylenimine were added. At a temperature between 30–35° C., 262 parts of 37% aqueous formaldehyde was added dropwise with stirring. After the formaldehyde addition was completed, the reaction mixture was heated to 50° C. for 2 hours.

The resulting clear solution was stirred in a glass reaction vessel and H$_2$S was bubbled through for 3¼ hours, with a temperature rise to 80° C. Two phases were formed. The lower rust brown phase was dissolved in 450 parts CHCl$_3$. The solution was washed three times with 300 parts hot water. The CHCl$_3$ solution was distilled under high vacuum up to 100° C. Eighty parts of a viscous brown residue were recovered.

Analysis.—7.7% nitrogen.

In a subsequent operation, 100 parts of "Epon 828" and 75 parts of the reaction product of the Na salt of 2,6-di-(N-ethyleniminomethyl)-4-methyl phenol and H$_2$S were mixed, cured and tested as in Example 1. An average shear adhesion of 1795 p.s.i. was obtained.

The aziridinophenol reagent used in this example may be prepared by reaction of ethylenimine with 2,6-dimethylol-4-methyl phenol in the presence of sodium carbonate under anhydrous conditions at reflux conditions at atmospheric pressure.

EXAMPLE 7

The following adhesive formulation was mixed and tested as described below:

75 parts "Epon 828"
25 parts "DEN 438" (epoxidized novolac resin)
65 parts reaction product of ethylene bis(beta-N-ethylenimino propionate) and H$_2$S.

Coupons were prepared from a 1" x 4" strip of phosphated steel and a 1" x 4" strip of fiber glass reinforced polyester, the test surface of which has been lightly sanded and wiped with methyl ethyl ketone. The adhesive was applied to the test surfaces of the coupons in a thin coat and the members were placed together with only contact pressure. The member overlap was ½ inch, giving ½ sq. in. test area. The specimen was assembled with the test portion in the center of the work coil of a 0.5 kilowatt induction heater. The cure time in the induction heater was 10 seconds. The specimens were then pulled by an Instron tester at 0.05 in./min. crosshead speed. The average shear adhesion was 2,230 p.s.i. with primarily failure of the polyester laminate.

DISCUSSION OF DETAILS

The amounts of the reagents employed in producing compositions in accordance with this invention are not narrowly critical. The amount of the multiaziridino compound employed can be such that there is present at least one aziridinyl group for each mole of hydrogen sulfide employed. Where less than one aziridinyl group is present for each mole of hydrogen sulfide, the resulting reaction product will be substantially a monomeric type adduct. Where the ratio of aziridinyl groups to H$_2$S is greater than 1:1, the resulting products are generally increased in complexity and contain a plurality of moieties from the multiaziridino compound. Mixtures of multiaziridino compounds can be used in such cases and mixed products obtained. As such ratio increases above 1:1, e.g., 2:1 to 10:1, the products tend to be polymeric comprising a plurality of moieties of the multiaziridino compound joined by —S— linkages.

Within the class of multiaziridino compounds useable in the invention, there are two useful specific groups of polyaziridinyl hydrocarbons, namely, compounds having the formula:

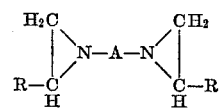

wherein

A is a 4 to 6 carbon atom saturated or unsaturated aliphatic radical, and

R is hydrogen or 1 to 3 carbon atom alkyl.

And compounds having the formula:

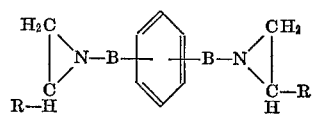

wherein

R is 1 to 3 carbon alkyl, and

B is an alkylene radical containing 1 to 6 carbon atoms.

Specific examples of multiaziridino alkanes or alkenes which may be advantageously used include:

1,4-di-(N-ethylenimino)butane
1,5-di-(N-ethylenimino)pentane
1,4-di-(N-butylenimino)butene-2
1,6-di-(N-ethylenimino)hexane
1,5-di-(N-ethylenimino)-3-(N-ethyleniminomethyl) pentane
3-methylene-1,5-di-(N-ethylenimino)pentane
1,4-di-(2-methyl, 3-amylaziridino)butane With respect to multiaziridino methylene benzenes, suitable examples of compounds include:

p-bis-(N-butyleniminomethyl)benzene
p-bis-(N-ethyleniminomethyl)benzene
o-bis-(N-butyleniminomethyl)benzene
p-bis-(N-propyleniminomethyl)benzene
p-bis-(2,3-dimethylaziridinomethyl)benzene
m-bis-(2-methyl, 3-amylaziridinomethyl)benzene
1,2,4-tris-(N-butyleniminomethyl)benzene
1,3-bis-(N-butyleniminomethyl)naphthalene
1,2,4,6-tetra-(n-ethyleniminomethyl)benzene
1,2,8-tris-(N-propyleniminomethyl)naphthalene.

Illustrative of additional multiaziridinyl aryl compounds which can be employed in producing the compositions of this invention are, for example, the ortho, meta or para isomers of:

bis-(N-ethyleniminoethyl)benzene
bis-(N-ethyleniminoisopropyl)benzene
bis-(N-propyleniminoethyl)benzene
bis-(N-propyleniminoisopropyl)benzene bis-(N-butyleniminoethyl)benzene
bis-(N-butyleniminoisopropyl)benzene as well as:

bis-(N-ethyleniminoethyl)naphthalenes
bis-(N-ethyleniminoisopropyl)naphthalenes
bis-(N-butyleniminoethyl)naphthalenes
bis-(N-ethyleniminoethyl)biphenyls;

and the like.

Examples of the aromatic nuclei which X represents in the general formula given hereinbefore include the di-, tri-, and tetra-valent groups derived from benzene, toluene, ethyl benzene, naphthalene, anthracene, diphenyl, phenanthrene, terphenyl, xylene and their alkyl substituted derivatives and the like. It is understood, of course, the alkyl substituted aromatic compounds such as mesitylene (trimethyl benzene) could oly be a di- or tri-valent group, and durene (tetramethyl benzene) could only be divalent.

Another class of multiaziridino compounds advantageously used in the invention are aziridinocarboxylic acid esters as disclosed in copending application Ser. No. 577,804, filed Sept. 8, 1966, now abandoned, the disclosure of which is incorporated herein by reference. Such compounds useable herein may be represented by the following formula:

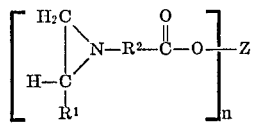

wherein $n$ is the integer 2 or 3,
$R^1$ is a hydrogen or hydrocarbon radical containing 1 to 18 carbon atoms,
$R^2$ is a bivalent hydrocarbon radical, especially such radical containing 1 to 6 carbon atoms, and
Z is a polyvalent hydrocarbon radical, especially such radical containing 1 to 6 carbon atoms.

Representative examples of aziridinocarboxylic acid esters of this class include:

1,3-propylene bis-(beta-N-propylenimino)propionate
ethylene bis-(beta-N-ethylenimino)propionate
1,6-hexylene bis-(beta-N-propylenimino) propionate
1,2,3-propylene tris-(alpha-N-ethylenimino)acetate
1,3-hexylene bis-(8-N-ethylenimino)caprylate
1,2-propylene bis-(beta-N-propylenimino)propionate
1,2-propylene bis-(beta-N-tetramethyl ethylenimino) propionate
ethylene bis-(p-N-ethylenimino)benzoate
ethylene bis-(alpha-N-ethylenimino) stearate.

In the production of adhesives incorporating the new reaction products, various known adhesive materials may be used to advantage. Particularly suitable are epoxy resins, polyurethanes, and other adhesive materials reactive with an active hydrogen compound. A wide variety of epoxy resins or ethoxyline materials are available for this use, e.g., see U.S. Pats. 2,863,853; 2,890,196 and 2,890,204.

Useable products can be formed by mixtures which consist solely of the reaction product of the multiaziridine and hydrogen sulfide. Mixtures of two or more of these products may advantageously be employed. Also, additional compounding agents commonly employed in rubber and polymer fabrication may be incorporated. Such added materials may typically constitute 1–75% and preferably 5–50% of the total composition including the multiaziridine reaction product. Examples of such additional materials include fillers or pigments, e.g., carbon black, chalk, zinc oxide, barium sulfate, titanium dioxide, chromium oxide and the like; fire retardants, e.g., polychloro-aromatic compounds, zinc borate, antimony sulfides and the like; light stabilizers, antioxidants; plasticizers, e.g., dialkyl phthalates, fatty acid esters, etc.; heat stabilizers, mold release lubricants and the like.

CONCLUSION

Novel compositions of matter have been described which are prepared by allowing di- or tri-aziridino compounds to react with hydrogen sulfide. The resulting products are particularly useful in up-grading known adhesives, e.g., epoxy resins. Air curing properties of the reaction products also are attractive in creating paints and other coating compositions.

What is claimed is:

1. A composition useful as an adhesive comprising 5 to 95% of a 1,2-epoxy resin consisting of carbon, hydrogen and oxygen and 95 to 5% of the reaction product of hydrogen sulfide with a multiaziridino compound of the formula:

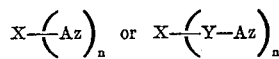

wherein the letters designate radicals as follows:
X is divalent or trivalent aryl having up to 18 carbon atoms, divalent or trivalent alkyl having up to 6 carbon atoms, or

$R^1$ is hydrogen, hydrocarbon, —Az or —Y—Az;
Az is

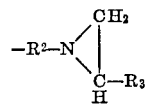

$R^2$ is alkylene;
$R^3$ is hydrogen or alkyl;

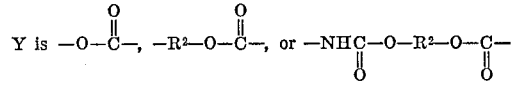

and $n$ is an integer selected from 2 and 3.

2. A composition as claimed in claim 1 consisting essentially of 2 parts of a reactive polyglycidyl ether of 2,2-bis(4-hydroxyphenyl)propane and 1 part of the reaction product of bis(2-aziridinoethyl)benzene and hydrogen sulfide.

3. A composition as claimed in claim 1 wherein said multiaziridino compound has the formula:

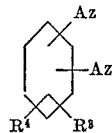

wherein

Az and $R^3$ are as defined in claim 1, and
$R^4$ is hydrogen, hydroxy, alkoxy or alkyl.

4. A composition as claimed in claim 1 wherein the radicals $R^1$, $R^2$ and $R^3$ contain up to six carbon atoms.

5. A composition as claimed in claim 1 wherein said multiaziridino compound has the formula:

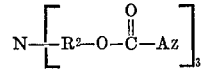

6. A composition as claimed in claim 1 wherein said multiaziridino compound has the formula:

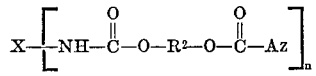

7. A composition as claimed in claim 6 wherein said multiaziridino compound is 2,4-tolylene bis(2-aziridinopropionoxy ethyl) urethane.

8. A composition as claimed in claim 1 wherein the multiaziridino compound has the formula

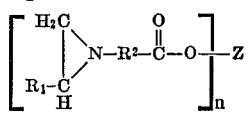

where
R¹ is hydrogen or hydrocarbon radical of 1 to 18 carbon atoms, and
R₂ is alkylene, and
Z is a hydrocarbon radical containing 1 to 6 carbon atoms and having a valence of 2 or 3.

9. A composition as claimed in claim 1 wherein said epoxy resin is used in an amount of 25 to 75% and said reaction product is used in an amount of from 75 to 25%.

10. A composition as claimed in claim 1 wherein the ratio of aziridinyl groups of said multiaziridino compound to the moles of H₂S to form said reaction product is from above 1:1 to 10:1.

References Cited
UNITED STATES PATENTS
3,576,786   4/1971   Kalfayan _____ 260—47

WILLIAM H. SHORT, Primary Examiner

T. E. PERTILLA, Assistant Examiner

U.S. Cl. X.R.

117—127; 161—186; 260—31.8 E, 37 EP 59; 2 EN, 77.5 AM, 830 TW

UNITED STATES PATENT OFFICE
CERTIFICATE OF CORRECTION

Patent No. 3,730,945　　　　　　　　Dated May 1, 1973

Inventor(s) Heinz Uelzmann et al.

It is certified that error appears in the above-identified patent and that said Letters Patent are hereby corrected as shown below:

Column 5, line 28, "cooled at 30° C." should read -- cooled to 30° C. --.

Signed and sealed this 29th day of January 1974.

(SEAL)
Attest:

EDWARD M. FLETCHER, JR.　　　　　RENE D. TEGTMEYER
Attesting Officer　　　　　　　　Acting Commissioner of Patents